United States Patent

Tompkins

[15] 3,683,186

[45] Aug. 8, 1972

[54] APPARATUS FOR INSPECTING TUBULAR GOODS USING A RADIATION-FOCUSSING DEVICE FOR PRODUCING A SUBSTANTIALLY UNIFORM COMPOSITE RADIATION PATTERN

[72] Inventor: David R. Tompkins, Houston, Tex.

[73] Assignee: Schlumberger Technology Corporation, New York, N.Y.

[22] Filed: March 26, 1970

[21] Appl. No.: 22,932

[52] U.S. Cl. ............... 250/83.3 D, 250/52, 250/83 C, 250/105, 250/106 S
[51] Int. Cl. ........................... G01t 1/17, G01n 23/05
[58] Field of Search ......... 250/105, 83.3 D, 83 C, 52, 250/106 S

[56] References Cited

UNITED STATES PATENTS

| | | | |
|---|---|---|---|
| 3,066,254 | 11/1962 | Price et al. | 250/83.3 S UX |
| 3,440,421 | 4/1969 | Lowman et al. | 250/105 R X |
| 3,323,286 | 3/1968 | Han | 250/105 R |

*Primary Examiner*—James W. Lawrence
*Assistant Examiner*—Morton J. Frome
*Attorney*—Ernest R. Archambeau, Jr., Stewart F. Moore, David L. Moseley, William R. Sherman, John P. Sinnott and Edward M. Roney

[57] ABSTRACT

In the new and improved radiation apparatus disclosed herein for inspecting tubular goods, a radiation detector is coaxially positioned within a tubular member being axially translated along a selected inspection axis for receiving radiation from a uniquely-arranged radiation emitter facing the detector and rotating around the exterior of the tubular member. In the preferred embodiment disclosed herein, this unique radiation emitter includes an array of side-by-side radioactive sources of selected strengths respectively directed inwardly through laterally-spaced, generally-parallel focussing passages for producing individual sharply-defined radiation beams respectively having a transverse width substantially smaller than that of the active portion of the detector. The outer or flanking sources of the array are arranged in relation to the intermediate source so that the radiation beams of the two outer sources will be directed on opposite sides of the inspection axis and the radiation beam of the intermediate source will intersect the inspection axis. In this manner, lateral movements of the detector to one side or the other of the inspection axis will progressively bring the active portion of the detector into the radiation pattern produced by one of the flanking sources as the detector moves out of the radiation pattern of the intermediate source. Accordingly, by cooperatively selecting and positioning the sources in operative relation to one another and to the detector, a substantially constant radiation intensity will contact the detector when it is at any position within a selected boundary around the inspection axis so that random or erratic shifts of the detector within the moving tubular member will not affect the accuracy of the measurements being obtained.

29 Claims, 5 Drawing Figures

PATENTED AUG 8 1972
3,683,186
SHEET 1 OF 2
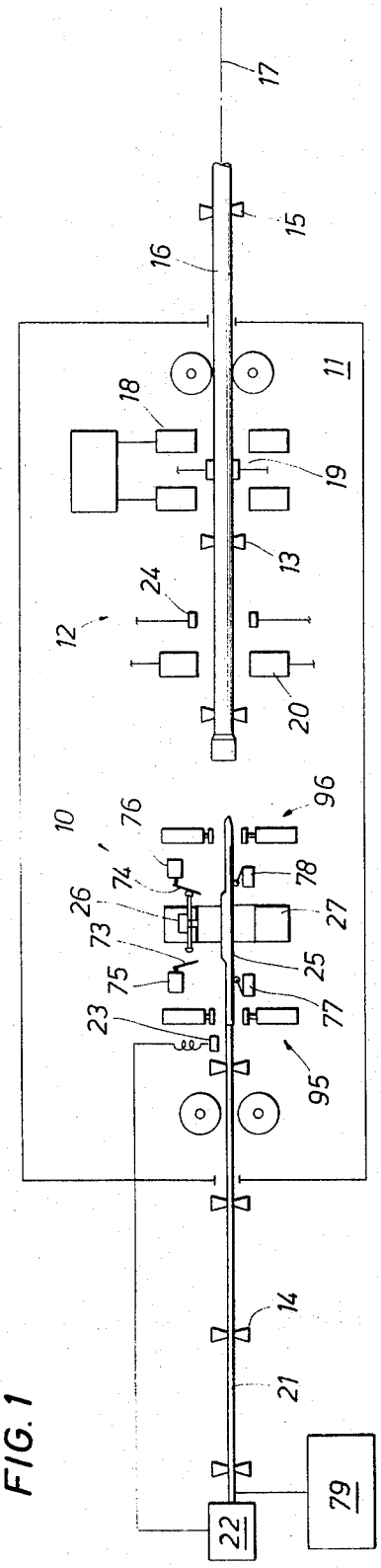
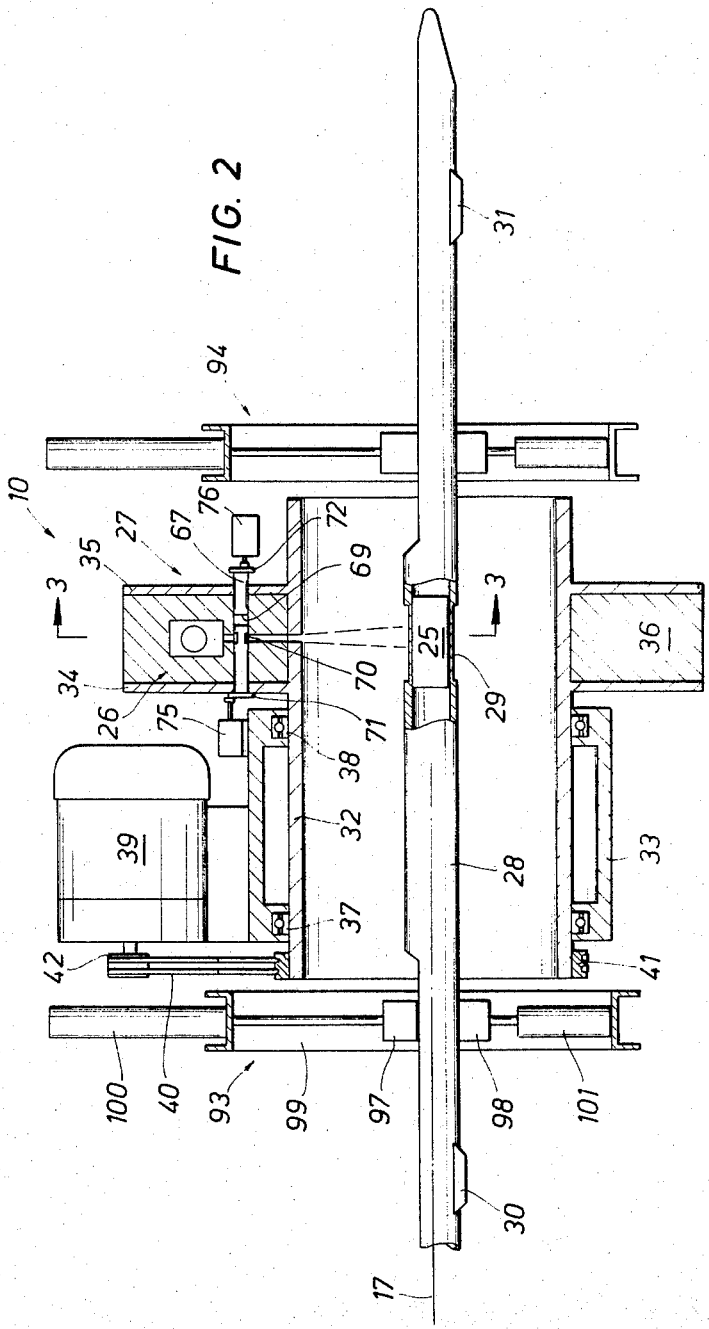
David R. Tompkins
INVENTOR
BY
*[signature]*
ATTORNEY

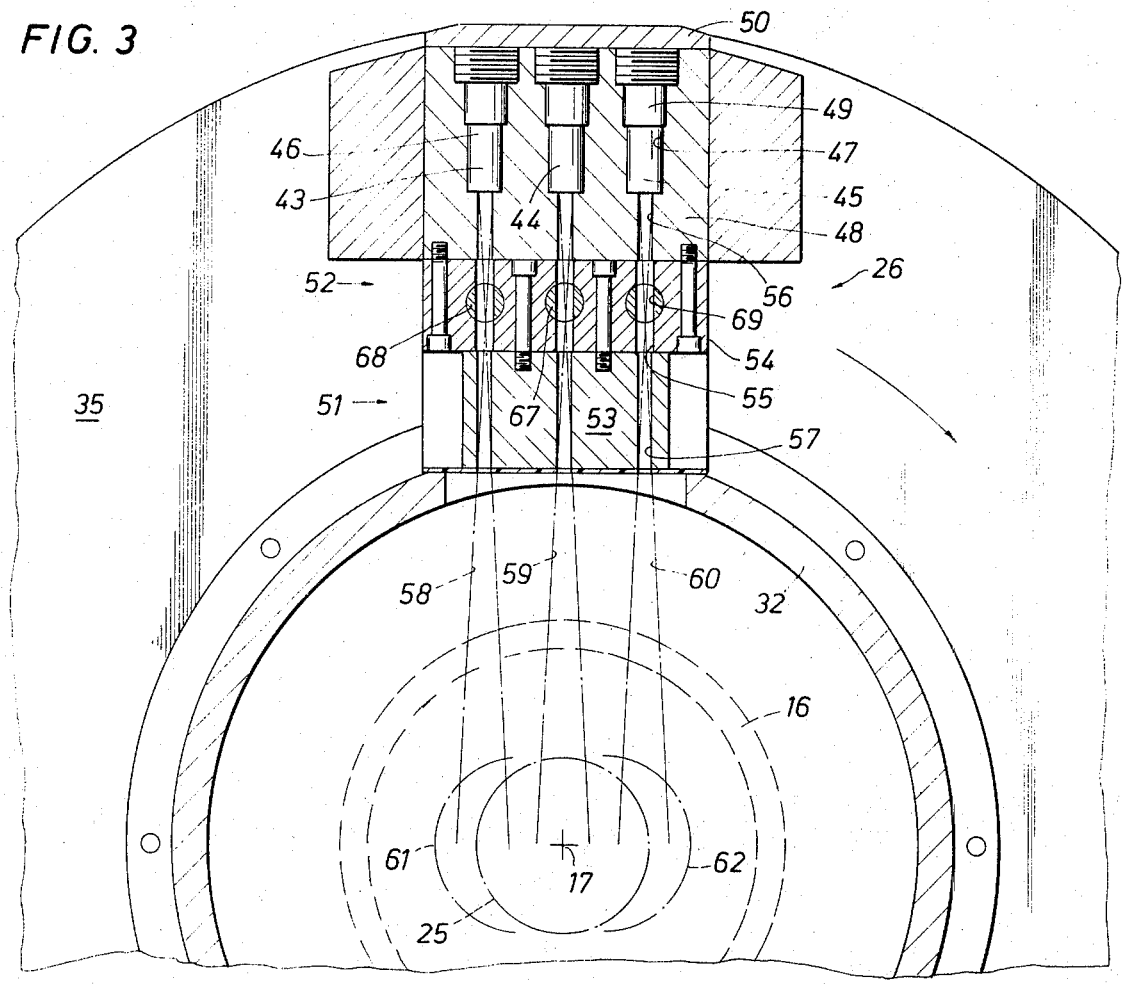
FIG. 3
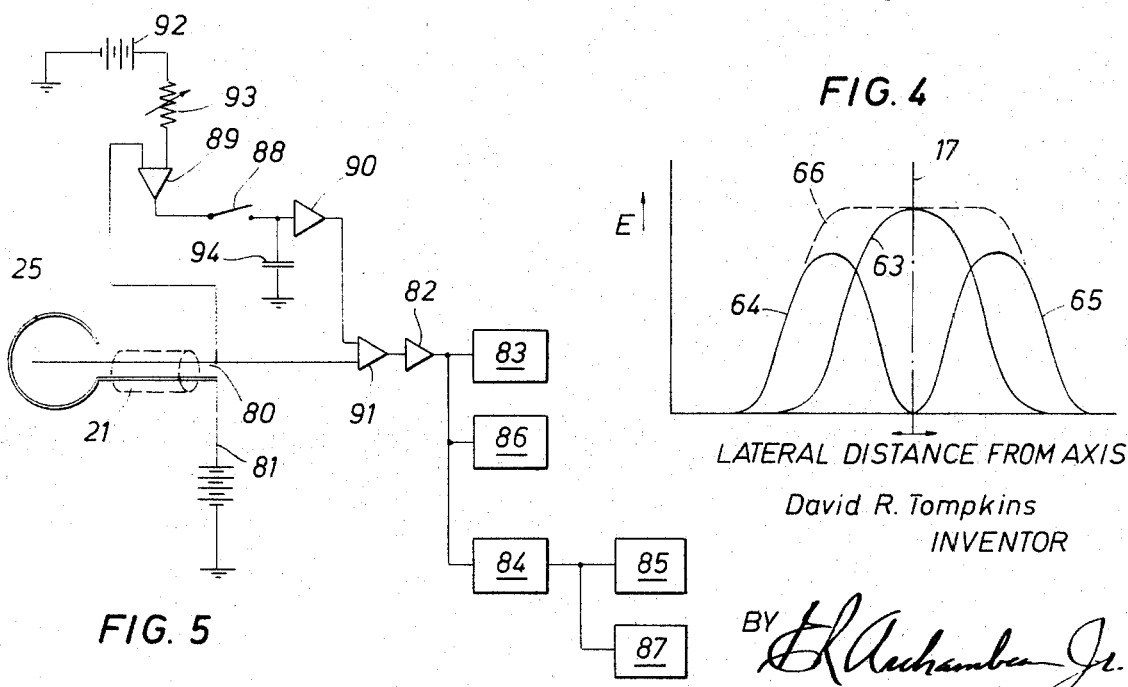
FIG. 4
LATERAL DISTANCE FROM AXIS
David R. Tompkins
INVENTOR
BY [signature]
ATTORNEY
FIG. 5

APPARATUS FOR INSPECTING TUBULAR GOODS USING A RADIATION-FOCUSSING DEVICE FOR PRODUCING A SUBSTANTIALLY UNIFORM COMPOSITE RADIATION PATTERN

Elongated tubular goods, such as oil-field piping or tubing and the like, are frequently inspected for hidden flaws and other latent defects that might cause failure of such tubular members while in service. As one aspect of such inspections, it is often desired to also obtain representative measurements of wall thickness of such tubular members at spaced points along their length. It will be recognized, of course, that such thickness measurements must be obtained at several points around the circumference of a pipe as well as along its entire length to be certain of reliably detecting imperfections.

Various thickness-measuring devices have, of course, been devised heretofore for inspecting long lengths of pipe and tubing. For instance, one typical device of this nature employs a rigidly-interconnected radiation detector and radioactive source that are simultaneously rotated around an axially-moving pipe, with the resulting variations in measured radiation intensity being used to derive corresponding wall-thickness measurements along a generally-helical path around the tubular member. Although the ideal situation would be to move the pipe being inspected slowly and rotate the radiation devices at high speed, practical considerations necessarily restrict these units to low rotative speed which correspondingly further limit the axial speed of the pipe joints and, therefore, result in inefficient inspection rates.

Alternatively, the new and improved inspection device disclosed in a copending patent application (Ser. No. 744,861) by the present inventor has been found to provide accurate thickness measurements of various tubular goods at efficient inspection rates. As described in that application, a radiation detector is mounted on the free end of a fixed, but relatively flexible, elongated lance that is aligned along a selected inspection axis and adapted to receive a tubular member being moved axially along the axis. A radiation source is suitably mounted within an annular rotatable member adapted for rotation at high speeds around the exterior of a tubular member moving along the inspection axis. By means of a unique arrangement of converging focussing slots, a sharply-defined radiation pattern substantially smaller in area than the active portion of the radiation detector is imposed thereon. In this manner, limited lateral or vertical movements of the radiation detector confined within the moving tubular member being inspected will produce only a negligible effect on the measurements provided by the radiation detector.

Although this new and improved inspection apparatus has proven to be successful in certain situations, it has been found that the extreme narrowness of the single radiation pattern produced thereby restricts the use of a given unit to the inspection of tubular members only within a limited range of diameters. Moreover, it has been found that tubular members being inspected with this apparatus have to be retained as nearly as possible in coincidental alignment with the inspection axis of the apparatus to assure maximum accuracy. Accordingly, in view of these two limiting factors of these prior units, the inspection of elongated tubular members which are slightly bent or the inspection of groups of such members of widely-varying diameters require special operating and handling techniques which correspondingly reduce the efficiency of the inspection operation.

Accordingly, it is an object of the present invention to provide new and improved radiation apparatus for accurately and quickly measuring the wall thicknesses of elongated tubular members, such as oil-field tubular goods, of widely-different diameters as well as such elongated members having minor bends or discontinuities along their length.

It is still another object of the invention to provide a new and improved radiation thickness-measuring system for inspecting axially-moving tubular members in which random motions of a radiation detector positioned within the members do not impair the quality of the measurements.

These and other objects of the present invention are attained by mounting radiation-detecting means on the free end of an elongated support that is generally aligned along a selected inspection axis and adapted for reception in a tubular member moving axially along the inspection axis. Radiation-emitting means including a plurality of radiation sources cooperatively associated with inwardly-directed focussing passages formed within radiation-shielding means are adapted for rotation about the inspection axis to produce corresponding narrow radiation patterns which are distributed transversely across the inspection axis. In this manner, upon rotation of the radiation-emitting means about a tubular member of given thickness, the total flux or intensity (i.e., total radiation energy in roentgens per unit of time, for example) of the radiation passing through the intervening wall of the tubular member and intercepted by the radiation-detecting means will remain substantially constant irrespective of even significant variations in either the spacing or alignment between the radiation-emitting means and the radiation-detecting means.

The novel features of the present invention are set forth with particularity in the appended claims. The invention, together with further objects and advantages thereof, may be best understood by way of the following description of examplary apparatus employing the principles of the invention as illustrated in the accompanying drawings, in which:

FIG. 1 schematically illustrates thickness-measuring apparatus employing the radiation means of the present invention as it may be arranged for cooperation with typical flaw-inspection apparatus;

FIG. 2 is an elevational view, partially in cross-section, of a preferred arrangement of the thickness-measuring apparatus depicted in FIG. 1;

FIG. 3 is an enlarged cross-sectional view taken along the lines "3—3" in FIG. 2 and depicts a preferred embodiment of radiation-emitting means arranged in accordance with the principles of the present invention;

FIG. 4 is a graphical representation illustrating the performance of the new and improved radiation means of the present invention; and FIG. 5 is a schematic block diagram of a preferred arrangement of electronic circuitry for use with the thickness-measuring apparatus illustrated in FIGS. 1 and 2.

Turning now to FIG. 1, a schematic plan view is shown of thickness-measuring apparatus 10 arranged in accordance with the present invention and operatively mounted within a vehicle 11. To illustrate a typical situation in which the new and improved apparatus 10 can be advantageously used, the thickness-measuring apparatus is depicted as being axially aligned with other pipe-inspection apparatus 12 such as the flaw-inspection apparatus disclosed in the Tompkins U.S. Pat. No. RE 26,537. As is typical, the thickness-measuring apparatus 10 includes pipe-translating means, such as a selectively-powered conveyor 13 (which may be the conveyor shown in U.S. Pat. No. 3,565,310 mounted within the vehicle 11 and a pair of portable conveyors 14 and 15 (such as those disclosed in U.S. Pat. No. 3,250,404) arranged at the opposite ends of the vehicle, for selectively moving pipe sections as at 16 back and forth through the vehicle along a generally-horizontal inspection axis 17.

Reference should be made, of course, to the aforementioned Tompkins patent for elaboration of the details of the flaw-inspection apparatus 12 and the particulars of its operation. However, the general arrangement of the flaw-inspection apparatus 12 and a typical inspection operation therewith should be understood to better appreciate its cooperation with the new and improved apparatus 10. In general, therefore, the flaw-inspection apparatus 12 is arranged to first progressively induce a longitudinally-oriented magnetic flux in a horizontal pipe, as at 16, being advanced axially in a first direction along the conveyor 13 so that transversely-oriented flaws in the pipe can be concurrently detected. Residual magnetism remaining in the pipe 16 is at least partially reduced by progressively subjecting the advancing pipe to a demagnetizing flux after it has been inspected for transversely-oriented flaws. When the pipe 16 is also to be inspected for longitudinally-oriented flaws, the pipe is moved onto the conveyor 14 and, after being halted, subjected to a circumferentially-oriented magnetic field. Thereafter, as the pipe 16 is returned in the opposite direction along the inspection axis 17, it is progressively inspected for longitudinally-oriented flaws. On the other hand, when this latter inspection is not performed, the pipe 16 is merely returned back through the vehicle 11 to the conveyor 15. In either situation, however, it is preferred that the new and improved thickness-measuring apparatus 10 be arranged for operation upon the return movement of the pipe 16 whether or not the latter flaw inspection is conducted.

To perform these inspections for transverse flaws, the inspection apparatus 10 preferably includes an annular coil 18 having spaced sections concentrically arranged around the inspection axis 17 with a plurality of flux-detecting heads 19 arranged therebetween. A second annular coil 20 is also concentrically arranged around the inspection axis 17 to the rear of the flux-inducing coil 18 and connected to a suitable AC or pulsating DC source (not shown) for progressively demagnetizing the pipe 16 as it leaves the flux-inducing coil.

The flaw-inspection apparatus 12 further includes an electrically-conductive, cantilevered elongated probe or lance 21 that is supported at its remote end and maintained in substantially-coincidental alignment along the inspection axis 17. When the pipe 16 is to be inspected for longitudinal flaws, it is advanced onto the lance 21 and halted when the lance has passed completely through the pipe and its free end projects out of the rearward end of the pipe. To subject the pipe 16 to a circumferentially-oriented magnetic field, a DC source 22 is connected between the remote supported end of the lance 21 and one or more laterally-movable electrical contacts 23 that are selectively engageable with the free end of the lance. Thereafter, as the pipe 16 is being returned, a plurality of flux-detecting heads 24 are selectively moved into contact with and coaxially rotated about the moving pipe for detecting generally-longitudinal flaws therein. As previously mentioned, it is preferred to operate the new and improved thickness-measuring apparatus 10 as the pipe 16 is withdrawn from over the lance 21 whether or not the pipe is to be inspected for longitudinal flaws.

In general, as depicted in FIG. 1, the new and improved thickness-measuring apparatus 10 is comprised of radiation-detecting means including a radiation detector 25 operatively positioned along the axis 17 and new and improved radiation means 26 mounted on a body 27 adapted for rotation about the inspection axis and operatively arranged for producing a plurality of inwardly-directed beams of radiation of a predetermined intensity which are distributed across a selected transverse plane for passing through the wall of the pipe 16 for interception by the radiation detector.

As illustrated in FIG. 2, the radiation detector 25 is comprised of a typical radioactivity detector, such as an ionization chamber or a scintillation detector, which is mounted in a suitable enclosed protective housing 28 that is carried on the free end of the elongated probe 21. To adapt the detector 25 for movement relative to the lower internal wall of the pipe 16 as it is axially advanced or returned along the inspection axis 17, the protective housing 28 includes a central tubular portion 29 of nylon, or the like, that will not significantly attenuate incident radiation. In the embodiment illustrated in FIG. 2, a plurality of removable centralizing members, as at 30 and 31, are spaced circumferentially about the end portions of the detector housing 28 for retaining the detector 25 in general coincidental alignment with the inspection axis 17. As a matter of convenience, the centralizers 30 and 31 are adapted to be readily exchanged with other members (not shown) of greater or lesser heights so that the new and improved inspection apparatus 10 will be effective for inspecting a wide range of sizes of tubular members. As will be subsequently explained, by arranging the radiation means 26 to produce discrete beams of radiation that are each of a reduced transverse width somewhat less than that of the effective portion of the detector 25 and distributing these beams at predetermined intervals across the plane of rotation the radiation detector will produce a uniform output signal even when it is eccentrically disposed in relation to the inspection axis 17.

Accordingly, in the preferred embodiment of the thickness-measuring apparatus 10 shown in FIG. 2, the radiation detector 25 is mounted on the free end of the lance 21 and coaxially positioned within the rotating body 27 which includes a horizontal, generally-tubular member 32 having one end portion rotatably journalled within an enlarged, annular stationary housing 33 and adapted for high-speed rotation around the longitudinal inspection axis 17. The radiation means 26 are eccentrically located between two longitudinally-spaced annular plates or flanges 34 and 35 secured to the unsupported or other end portion of the rotatable member 32. To dynamically balance the rotating body 27, a target 36 of sufficient mass is mounted between the spaced flanges 34 and 35 diametrically opposite of the radiation means 26.

As best seen in FIG. 2, the rotating body 27 is concentrically arranged about the horizontal inspection axis 17 and journalled within the housing 33 by a pair of longitudinally-spaced bearings 37 and 38 carrying the supported end portion of the tubular member 32. In one manner of driving the rotating body 27 at high speeds about its rotational axis 17, the supported end of the tubular member 32 is extended beyond the outboard bearing 37 and coupled to driving means, such as a motor 39 mounted outside of the housing 33, by a suitable power transmission such as a typical chain or belt 40 operatively interconnecting a pulley 41 mounted on the tubular member and a pulley 42 mounted on the shaft of the motor.

Turning now to FIG. 3, in the preferred embodiment of the present invention, the radiation means 26 include an array of three isotropic radiation sources 43-45 (such as Cobalt 60, Cesium 137, or other acceptable sources of gamma radiation) which are respectively encased in typical source cups, as at 46, each having an opening in its lower end. The encapsulated radiation sources 43-45 are respectively disposed within one of three chambers, as at 47, formed side-by-side in the upper portion of a block 48 of a suitable radiation-attenuating or shielding material. To fully enclose the sources 43-45, a removable closure member, as at 49, is fitted into the open end of each of the source chambers 47 and a suitable cover plate 50 is secured to the shielding block 48 over each of the closure members.

The radiation means 26 of the present invention further include particularly-arranged radiation-focussing means 51 as well as selectively-operable radiation-blocking or shutter means 52 operatively disposed between the focussing means and the radioactive sources 43-45. As best seen in FIG. 3, the focussing means 51 are comprised of a second block 53 formed of steel, tungsten, lead or some other suitable radiation-attenuating or shielding material that is mounted between the annular flanges 34 and 35 and spaced radially inwardly from the shielding block 48 and diametrically opposite from the target shield 36 (FIG. 2). The shutter means 52 are comprised of a third block 54 of radiation-shielding material mounted between the shielding block 48 and the focussing block 53 and having three generally-parallel radiation passages, as at 55, which are respectively aligned with three corresponding radiation passages, as at 56 and 57, respectively formed in the first and second blocks. As will subsequently be explained in greater detail, the shutter means 52 are uniquely arranged for selectively controlling the passage of radiation from the sources 43-45 to the detector 25.

Of paramount significance to the present invention, it will be noted from FIG. 3 that the radioactive sources 43-45 are uniquely arranged so that separate, generally-parallel beams of radiation 58-60 are directed along a selected transverse plane intersecting the inspection axis 17. In particular, in the preferred embodiment of the invention, the radiation means 26 are arranged so that two of the three radiation beams 58 and 60 are respectively directed on opposite sides of the axis 17 and the third beam of radiation 59 will intersect the inspection axis. Accordingly, when the detector 25 is in position and coincidentally aligned with the inspection axis 17, the radiation beam 59 from the central radioactive source 44 will be directly impinged on the detector and the exterior or flanking beams of radiation 58 and 60 will substantially uniformly straddle the detector. On the other hand, as schematically depicted by the dashed circles 61 and 62, should the detector 25 be shifted laterally to either side of the inspection axis 17, the active portion of the detector will progressively receive more radiation from one or the other of the two flanking beams 58 (or 60) and correspondingly receive a lesser amount of radiation from the central beam 59. The significance of this will best be appreciated by the representative response curves for the detector 25 as graphically depicted in FIG. 4.

Accordingly, as schematically represented in FIG. 4, by selecting a given energy or intensity for the central radioactive source 44, the detector 25 will respond to irradiation from this source as graphically depicted by the centrally-located response curve 63. As represented there, so long as the detector 25 remains coincidentally aligned with the inspection axis 17, the maximum intensity of the central radioactive source 44 will be received thereby so as to produce the maximum output as represented by the peak of this central response curve 63. On the other hand, lateral movement of the detector 25 to either one side or the other of the inspection axis 17 will progressively diminish the radiation intensity being received from the central source 44 by the detector and produce a correspondingly-reduced output signal generally as indicated by the portions of the central response curve 63 that asymptotically approach the distance axis on either side of the intensity maximum. The same results will, of course, be obtained for each of the two flanking sources 43 and 45 (FIG. 3) as shown by their respective response curves 64 and 65 (FIG. 4).

Accordingly, by selecting the sources 43 and 45 to have equal but lesser strengths than the central source 44 and cooperatively arranging the two flanking radioactive sources in the manner depicted in FIG. 3, as the detector 25 shifts to one side or the other of the inspection axis 17, the detector will be irradiated by a combination of one of the two flanking radiation beams, for example the left-hand beam 58, as well as the central radiation beam 59. Thus, as shown in FIG. 4, as the detector 25 moves further to the left, the progressively-increasing signal (as depicted by the response curve 64) produced by the weaker radioactive source 43 will be added to the progressively-diminishing signal (as shown by the response curve 63) produced by the central radioactive source 44 so as to produce a combined output as represented by the overall response curve 66. The same response will, of course, be obtained whenever the detector 25 shifts to the right-hand side of the inspection axis 17 except that the right-hand radioactive source 45 will produce a progressively-greater output signal (as shown by the response curve 65) as the output signal contributed solely by the central radioactive source 44 progressively diminishes. It will, of course, be appreciated that the strengths of the two flanking sources 43 and 45 are cooperatively selected in accordance with their lateral spacing from the central source 44 to obtain the additional intensity to make the combined output substantially constant across the range of lateral movements of the detector 25.

It will be appreciated, therefore, that the new and improved radiation means 26 of the present invention will produce a substantially-uniform output signal for a given thickness of metal between the radiation sources 43–45 and the detector 25 so as to at least minimize the effects which would otherwise be caused by lateral shifting of the detector within the pipe 16.

It should also be noted that even though the detector 25 may bounce upwardly and downwardly (vertically as viewed in FIG. 3) as the pipe 16 is being moved thereover, the radiation means 26 of the present invention will also provide substantially-uniform signals over an acceptable range of vertical movement of the detector inasmuch as the radiation beams 58–60 are well collinated and the sides of each beam is relatively parallel so that the flux density of each beam will be substantially equal at different vertical positions within the range of vertical movement of the detector. Thus, the vertical movements of the detector 25 are usually within a range where the axes of the radiation beams 58–60 can be perfectly parallel and still maintain a substantially-equal flux density within this range. It has been found, however, that by arranging the outer radiation passages 57 to converge the flanking beams 58 and 60 slightly inwardly a few degrees, the outer radiation patterns will be moved slightly inwardly toward the central radiation pattern to produce a more-uniform flux density over a greater range of vertical movements of the detector 25 without reducing its range of lateral movements.

It has been found that where typical oil-field tubular goods are being inspected, the efficiency of the new and improved thickness-measuring apparatus 10 is significantly improved where the radioactive sources 43–45 are selected for producing a substantial count rate at the detector 25 in the order of $10^6$ to $20^6$ counts per second as a tubular member is being inspected. With count rates of this magnitude, it will be appreciated that the detector 25 will be operated at optimum statistical accuracy so that pipes, as at 16, can be moved through the inspection apparatus 10 at reasonably-high axial speeds without unduly compromising the accuracy of the resulting thickness measurements.

To produce such high count rates while there is an intervening pipe wall between the radiation means 26 and the detector 25 will, of course, cause the detector to be subjected to much-greater count rates when a pipe is not positioned over the detector. It has been found, however, that with even the highest-quality radioactivity detectors, the prolonged exposure of the detector 25 to such greatly-increased count rates will rapidly cause the detector to begin drifting and that this drift or error is accelerated at an exponentially-increasing rate so long as the exposure is continued. Moreover, it has been found that even brief direct exposures of even a high-quality radioactivity detector to such greatly-increased count rates will quickly initiate unreliable or unstable operation of the detector 25 which will not be corrected until the detector has been inserted into a pipe for a considerable period of time. Such unpredictable operation of the detector 25 will, of course, either result in unreliable measurements being obtained or make it necessary to delay the inspection of another pipe until the detector has again stabilized.

Accordingly, as described in more detail in a copending application Ser. No. 22,935 filed simultaneously herewith by the present inventor, the shutter means 52 are operatively arranged for selectively attenuating the radiation beams 58–60 at all times that a pipe, as at 16, is not positioned over the detector 25. Thus, by reducing the intensity of radiation intercepted by the detector 25 to at least a reduced level that will not create the aforementioned unstability or drifting of the detector, the new and improved thickness-measuring apparatus 10 can be operated at efficient inspection rates without compromising the accuracy of the resulting measurements.

Referring again to FIGS. 2 and 3, it will be noted that the shutter means 52 include three elongated rods, as at 67, that are respectively arranged for sliding movement within complementary passages 68 formed in the block 54 and respectively intersecting the radiation passages 55 therein. In the preferred embodiment of the thickness-measuring apparatus 10, these intersecting passages 68 are parallel to the inspection axis 17 and the elongated rods 67 are of sufficient length that they will project outwardly from the forward and rearward faces of the flanges 34 and 35.

As best seen in FIGS. 2 and 3, each of these bars 67 is provided with a first portion having a transverse port, as at 69, formed therein of a similar or identical cross section as the radiation passages 55 and through which radiation may readily pass when these transverse openings are in registration with the radiation passages 55. In the preferred embodiment of the shutter means 52, a second portion, as at 70, of each of the bars 67 is formed to have a thickness of a selected and predetermined magnitude so that upon movement of the bars to position these reduced portions in alignment with the radiation passages 55, the radiation intercepted by the radiation detector 25 will be reduced to produce a selected count rate at the detector. It will be recognized, of course, that to attain the objects of the present invention, these obturating portions 70 of the bars 67 could be alternatively adapted to obtsruct most of the radiation emitted by the sources 43–45.

In either event, the new and improved thickness-measuring apparatus 10 is operatively arranged for selectively moving the shutter rods 67 to bring their respective openings 69 into registration with the radiation passages 55 just as the leading end of the pipe 16 approaches the detector 25 and then repositioning the rods to bring their respective obturating portions 70 back into the radiation passages 55 as the trailing end of the moving pipe passes over the detector. It will be appreciated, therefore, that these alternately-directed movements of the shutter bars 67 between their respective positions will assure that the detector 25 will be protected from exposure to excessive radiation intensities that could otherwise create the aforementioned problems with unstability or drifting of the detector.

In the preferred manner of accomplishing these alternately-directed movements of the shutter bars 67 and as disclosed and claimed in a copending application Ser. No. 22,933 filed simultaneously herewith, rounded knobs, as at 71 and 72, are mounted on the outer ends of each of the rods. Since the rods 67 will follow approximately the same circular path upon rotation of the rotating body 27, straps, as at 73 and 74 (FIG. 1), of a relatively-flexible material are respectively secured to the forward and rearward portions of the housing 33 and operatively arranged for pivotal movement from first positions away from the housing to second positions immediately adjacent thereto which respectively intercept the paths of rotation of the forward and rearward knobs 71 and 72. Selectively-operated solenoid actuators 75 and 76 are arranged adjacent to the straps 73 and 74, respectively, and so located that, upon energization of the first actuator 75, the strap 73 will be moved into the rotational path of the knobs 71 and will accordingly shift the shutter rods 67 to the position illustrated in FIG. 2 before the rotating body 27 completes a full revolution. Conversely, by energizing the second actuator 76, the shutter rods 67 will be quickly shifted in the reverse direction to their alternate position for opening the radiation passages 55. In the preferred embodiment of the thickness-measuring apparatus 10, the selective operation of the solenoid actuators 75 and 76 is accomplished by arranging typical limit switches, as at 77 and 78 in FIG. 1, for contact by the pipe 16 as it passes along the conveyor 13 to shift the shutter rods 67 back and forth in proper coordination with the operation of the thickness-measuring apparatus.

It will, of course, be appreciated that as far as the requirements of the present invention are concerned, circuitry such as that shown in FIG. 8 of U.S. Pat. No. 3,565,310 can be efficiently employed for obtaining adequate records with the new and improved thickness-measuring apparatus 10. In the preferred embodiment of the thickness-measuring apparatus 10, it is preferred, however, to employ new and improved circuitry such as schematically depicted at 79 in FIG. 5 of the present application and described in greater detail in the aforementioned application Ser. No. 22,935. As disclosed in greater detail in this last-mentioned application, the new and improved circuitry 79 is uniquely arranged for cooperation with the shutter means 52 arranged as further disclosed in that application.

In general, the circuitry 79 is uniquely arranged so that each time the shutter rods 67 are in their radiation-blocking positions, a calibration measurement is made of the thickness of the obturating portions 70 of the rods. Then, as a pipe, as at 16, is being inspected, the resulting thickness measurements being obtained are compared with the previously-obtained calibration measurement for determining the accuracy of these thickness measurements.

As described in greater detail in the aforementioned application, the circuitry 79 is appropriately arranged for converting the output signal of the radiation detector 25 to a meaningful record. To accomplish this, the output signal of the detector 25 is coupled by way of suitable conductors 80 and 81 and an amplifier 82 to an indicator, such as a recorder 83, that is appropriately arranged for progressively providing a continuous first indication representative of the wall thickness of a tubular member passing through the inspection apparatus 10. As an additional feature, the circuitry 79 also includes a time-averaging circuit 84 appropriately tuned to average the output of the detector 25 for each revolution of sources 43–45 to provide a second indication, as on a typical recorder 85, representative of the transverse cross-sectional metal area through that portion of the tubular member scanned in that revolution. In this manner, by driving the recorders 83 and 85 at speeds related to the axial speed of the pipe 16 past the apparatus 10, continuous meaningful records will be obtained of the actual metal thicknesses along the generally-helical inspection path around the pipe as well as of successive transverse cross-sectional metal areas along the length of pipe. The circuitry 79 further includes alarm indicators, as at 86 and 87, coupled to the recorders 83 and 85 and adapted for warning the operator of the apparatus 10 that the respective thickness and area measurements are less than some selected minimum value.

To provide the aforementioned calibration measurements, the circuitry 79 further includes a normally-open relay 88 which is appropriately connected to the solenoid actuator 76 and adapted to be closed when the shutter rods 67 are in their radiation-blocking positions. In this manner, when the radiation passages 55 are closed, the output of the detector 25 will be temporarily coupled by way of an adder 89, a follower 90, and an adder 91 to the amplifier 82 to produce an input signal at the recorder 83 that corresponds to the known thickness of the obturating portions 70 of the shutter bars 67. A selectively-adjustable reference signal, such as provided by a constant-voltage source 92 and potentiometer 93, is coupled to the other input of the adder 89 for accurately resetting the recorder 83 before the first pipe that is to be inspected is passed through the thickness-measuring apparatus 10. Once this reference signal is correctly set, the potentiometer 93 is not changed until such time that the thickness-measuring apparatus 10 is again recalibrated.

For reasons that will subsequently be explained, the adder 89 is a signal-inverting adder so that the combination of the detector output signal and the reference signal will be inverted by the adder to provide a calibration signal. The calibrated output signal from the inverting adder 89 is stored by a capacitor 94 and, by employing the high-impedance follower 90, will remain as a fixed input to the adder 91 after the relay 88 is opened. It will be appreciated, therefore, that when the relay 88 is closed and the reference signal is applied to the inverting adder 89, the inversion of the signals by the adder 89 will produce an output signal from the adder 91 that equals only the reference signal. On the other hand, the signal initially stored by the capacitor 94 will be the inverted summation of the reference signal and the output signal of the detector 25.

Accordingly, once the reference signal has been properly set to obtain the correct reading at the recorder 83, the potentiometer 93 is left alone and the first pipe, as at 16, is inspected. As these measurements are being obtained, it will be appreciated that the output signal of the adder 91 will be equal to the algebraic summation of the reference signal and the difference in the output signals of the detector 25 at that moment and at the time that the recorder 83 was calibrated. Thus, the recorder 83 will, in effect be recording the differences between the various wall thicknesses of the pipe 16 and the known thicknesses of the obturating portions 70 of the shutter bars 67. These readings can, of course, be presented either as a true thickness measurement or as a difference between this known thickness.

Once the first pipe has been inspected, the shutter bars 67 will, of course, be reclosed and the relay 88 will again be reclosed just before the next pipe is inspected. At this time, if there has been drifting of the detector 25, the calibration signal that is then stored on the capacitor 94 will be the inverted algebraic summation of the unchanged reference signal and the output signal of the detector which will be then produced as a result of any drifting. It will be recalled that the potentiometer 93 is not changed. Thus, with the relay 88 being reclosed, the output of the adder 91 will again be equal to only the original unchanged reference signal which will indicate that the circuitry 79 is still properly calibrated.

Once the next pipe is moved through the thickness-measuring apparatus 10 and the relay 88 is reopened, the resulting output signal from the adder 91 will again be equal to the algebraic summation of the reference signal and the difference in the output signals of the detector 25 at that moment and at the time the second calibrating signal was stored on the capacitor 94. Hereagain, the resulting signal recorded by the recorder 83 will be representative of the differences in the thicknesses of the pipe being inspected and the known thickness of the obturating portions 70 of the shutter bars 67.

It will be appreciated that a more-precise calibration signal can be stored in the capacitor 90 if the detector 25 is in a known position in relation to the radiation sources 43-49 at that time. Accordingly, in the preferred embodiment of the thickness-measuring apparatus 10, means are provided for temporarily fixing the detector 25 in a selected position as the calibration measurements are being obtained.

Accordingly, as more-fully explained in the aforementioned application (Attorney's Docket No. 26.63), in the preferred manner of accomplishing this, first and second selectively-operable clamping devices 95 and 96 (FIGS. 1 and 2) are arranged at opposite ends of the tubular member 32 and cooperatively arranged to secure the detector 25 in coincidental alignment with the inspection axis 17 as a calibration measurement is being obtained. In general, each of the clamping devices 95 and 96 is comprised of an opposed pair of horizontal bars, as at 97 and 98, which are respectively disposed above and below the conveyor 13 and operatively carried for vertical movement on suitable guides or uprights 99 stationed on opposite sides of the conveyor. Suitable devices, such as solenoid-actuators or hydraulic piston actuators as at 100 and 101, are operatively coupled to the clamping bars 97 and 98, respectively, and suitably arranged for moving the opposed bars in unison into clamping engagement on the respective end portions of the detector housing 28 for coaxially positioning the detector 25 therein when a calibration measurement is to be made. Once the calibration measurement is completed, the actuators 100 and 101 are reversed to return the clamping bars 97 and 98 to their normal positions so that the pipe 16 can freely pass through the clamping devices 95 and 96.

It will be appreciated, therefore, that the present invention has provided new and improved radiation apparatus for accurately and quickly measuring the wall thickness of elongated tubular members. By arranging the new and improved radiation means to produce a plurality of narrowly-focussed beams of radiation which are transversely distributed across the longitudinally-directed inspection axis, as a tubular member is advanced along this axis and over a radiation detector, one or more of the radiation beams will be intercepted thereby even though the detector is erratically moving and does not remain in coincidental alignment with the axis. Thus, by further selecting the several radioactive sources as described in detail herein, the output of the detector can be efficiently modified to provide a substantially-constant signal for a given thickness of metal over a predetermined range of eccentricity from the inspection axis.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A radiation-focussing device adapted for use with a radiation detector having a radiation-sensitive portion with a known transverse cross-sectional area and a known lateral width, and comprising: radiation-attenuating means having a plurality of side-by-side passages therein respectively having a transverse cross-sectional area smaller than said known cross-sectional area, said passages being operatively spaced apart and directed along longitudinal axes intersecting a selected transverse plane in front of said radiation-attenuating means at laterally-spaced intervals having a combined separation greater than said known lateral width; and a corresponding number of radioactive sources on said radiation-attenuating means to the rear of said passages and aligned therewith and operatively arranged for cooperation with said passages for producing individual radiation patterns spaced along said transverse plane individually having a transverse cross-sectional area less than said known transverse cross-sectional area and collectively having a combined lateral width greater than said known lateral width for producing a substantially-uniform composite radiation pattern substantially across said combined lateral width.

2. The radiation-focussing device of claim 1 wherein said radioactive sources are of different radiation strengths whereby said radiation patterns will have correspondingly-different flux densities.

3. The radiation-focussing device of claim 1 wherein there are at least three of said passages and said radioactive sources, with the first and third ones of said individual radioactive sources having equal radiation strengths less than the radiation strength of the second one of said radioactive sources, said radioactive sources and said passages being operatively arranged and spaced whereby said individual radiation patterns will have selected flux densities.

4. An inspection system comprising: a radiation detector positioned in a selected plane of movement and having a radiation-sensitive portion with a known lateral width; a radiation-focussing means spaced from said radiation detector, said radiation-focussing means including a body of radiation-attenuating material having a plurality of elongated passages therein respectively aligned and directed along longitudinal axes respectively intersecting said plane of movement at laterally-spaced intervals having a combined spacing greater than said known lateral width, each of said passages having a selected lateral width and a selected longitudinal length for respectively defining radiation patterns spaced along said plane of movement and respectively having a lateral width less than said known lateral width; and a corresponding number of radiation sources respectively arranged on said body adjacent to the rear of said passages and directed therethrough for operatively producing said individual radiation patterns and providing a substantially-uniform composite radiation pattern along said plane.

5. The inspection system of claim 4 wherein said longitudinal axes are parallel to one another and perpendicularly intersect said plane of movement.

6. The inspection system of claim 4 wherein said longitudinal axes lie in a common plane perpendicularly intersecting said plane of movement.

7. The inspection system of claim 4 wherein said longitudinal axes perpendicularly intersect said plane of movement.

8. The inspection system of claim 7 wherein said radiation sources are operatively selected and their respective said radiation patterns have a selected lateral width and a selected lateral spacing along said plane of movement in relation to said known width of said detector active portion for producing a relatively-constant output from said radiation detector as said radiation detector moves across said composite radiation pattern.

9. The inspection system of claim 7 wherein there are at least three of said radiation sources and said passages, and the first and last of said radiation sources respectively have a radiation strength equal to one another and less than the radiation strength of intermediately-positioned ones of said radiation sources for subjecting said detector active portion to a relatively-uniform radiation intensity as said radiation detector moves between said radiation patterns produced by said first and last radiation sources.

10. The inspection system of claim 7 wherein there are at least three of said radiation sources and said passages, and the first and last of said passages are respectively spaced from intermediately-located ones of said passage in accordance with the respective radiation strengths of each of said radiation sources for subjecting said detector active portion to a relatively-uniform radiation intensity as said radiation detector moves between said radiation patterns produced by said first and last radiation sources.

11. The inspection system of claim 7 wherein there are at least three of said radiation sources and said passages, and the first and last of said radiation sources respectively have a radiation strength equal to one another and less than the radiation strength of intermediately-positioned ones of said radiation sources and said passages are respectively spaced from one another in mutual cooperation with the respective radiation strengths of each of said radiation sources for subjecting said detector active portion to a relatively-uniform radiation intensity as said radiation detector moves between said radiation patterns produced by said first and last radiation sources.

12. The inspection system of claim 11 wherein said longitudinal axes lie in a common plane perpendicularly intersecting said plane of movement.

13. Apparatus adapted for inspecting elongated tubular members and comprising: means adapted for axially moving an elongated tubular member along a predetermined inspection axis; radiation-detecting means having a radiation-sensitive portion with a known width and adapted for reception within said elongated tubular member moving along said inspection axis; and focussed radiation-emitting means including a plurality of radiation sources arranged in side-by-side relationship spatially disposed from said radiation-detecting means and adapted to be exterior of said elongated tubular member moving along said inspection axis, a shield of radiation-attenuating material carrying said radiation sources and having therein a corresponding number of side-by-side focussing passages respectively aligned with each of said radiation sources and directed toward said radiation-detecting means to establish a corresponding number of focussed radiation patterns thereon that are each of a smaller width than said known width of said radiation-sensitive portion but have a combined width greater than said known width for producing a substantially-uniform composite radiation pattern along a transverse plane crossing said inspection axis.

14. The inspection apparatus of claim 13 wherein said focussing passages are respectively formed about a longitudinal axis generally parallel to one another and intersecting said radiation-sensitive portion of said radiation-detecting means at laterally-spaced intervals along said transverse plane crossing said inspection axis.

15. The inspection apparatus of claim 13 wherein said focussing passages are respectively formed about a longitudinal axis generally parallel to one another with one of said longitudinal axes perpendicularly intersecting said inspection axis and the others of said longitudinal axes being spatially disposed on opposite sides of said one longitudinal axis.

16. The apparatus of claim 13 wherein said radiation-detecting means are radially omnidirectional and further including: means adapted for rotating said focused radiation-emitting means about an elongated tubular member moving along said inspection axis to progressively scan the circumference of such a member.

17. The apparatus of claim 13 wherein said radiation-detecting means are radially omnidirectional and further including: means adapted for rotating said focussed radiation-emitting means about an elongated tubular member moving along said inspection axis to progressively scan the circumference of such a member and obtain representative indications characteristic of the thickness of such scanned circumferential portions.

18. The apparatus of claim 17 further including: means adapted to average a succession of such representative thickness indications for obtaining second indications characteristic of the cross-sectional area of such scanned circumferential portions.

19. Apparatus adapted for inspecting elongated tubular members and comprising: means adapted to support an elongated tubular member for axial movement along a selected inspection axis; a body of radiation-attenuating material adapted for rotation about said elongated tubular member moving along said inspection axis and including a plurality of adjacent chambers therein spatially disposed from said inspection axis; a source of radiation in each of said chambers; radiation-focussing means on said rotatable body including a plurality of side-by-side passages respectively aligned between each of said radiation sources and laterally-spaced locations on a selected transverse plane across said inspection axis, said passages respectively having laterally-separated opposed wall surfaces of a selected length for producing an inwardly-directed narrowly-focussed radiation beam of a predetermined transverse width at each of said laterally-spaced locations for producing a substantially-uniform composite radiation pattern substantially across the total of said transverse beam widths; a radiation detector adapted for reception in said elongated tubular member moving along said inspection axis and including a radiation-sensitive portion having a transverse width greater than each of said predetermined transverse beam widths but less than the total of said transverse beam widths; and means adapted to retain said radiation detector at about said selected location within said elongated tubular member moving along said axis of movement.

20. The apparatus of claim 19 further including: means supporting said rotatable body for rotation about said inspection axis; and means selectively operable for rotating said rotatable body to progressively revolve said radiation beams about an elongated tubular member moving along said inspection axis.

21. The apparatus of claim 20 wherein the plane of revolution of said radiation beams is generally perpendicular to said inspection axis.

22. The apparatus of claim 21 wherein said body-supporting means include an annular member coaxially disposed about said inspection axis; a housing enclosing at least a portion of said annular member; first and second bearings operatively journaling said enclosed portion of said annular member to said housing; means coupling said radiation-attenuating body and said radiation-focussing means on one side of said annular member; and counterbalancing means on the other side of said annular member diametrically opposite said radiation-attenuating body and said radiation-focussing means.

23. The apparatus of claim 22 wherein said counterbalancing means include a shield member of a radiation-attenuating material mounted on said annular member diametrically opposite from said radiation-focussing means.

24. Apparatus adapted for inspecting elongated sections of pipe and comprising: pipe-translating means adapted to support sections of pipe and selectively operable for axially moving such pipe sections along a generally-horizontal inspection axis; a housing generally circumscribing said inspection axis; an annular member having a central opening therethrough and coaxially arranged around said inspection axis; means operatively journaling said annular member to said housing for rotation about said inspection axis and in a plane of rotation perpendicularly intersecting said inspection axis; radiation-emitting means on said annular member adapted for directing three narrowly-focussed beams of radiation inwardly along said plane of rotation to intersect selected positions on and adjacent to said inspection axis and produce a substantially-uniform composite radiation pattern across said inspection axis including three radioactive sources eccentrically mounted at laterally-spaced locations on said annular member, and a body of radiation-attenuating material on said annular member having a plurality of side-by-side inwardly-directed passages in said plane of rotation and respectively aligned between said radioactive sources and said selected positions; an elongated member fixed at one end and having a free portion extending generally along said inspection axis toward said elongated member; and a radiation detector secured to said free portion of said elongated member and adapted to be retained thereby at about said selected positions within a pipe section moving along said inspection axis and having a radiation-sensitive portion with a transverse width larger than the transverse width of each of said beams of radiation and smaller than the combined widths of said radiation beams for providing signals characteristic of variations in said beams of radiation contacting said radiation-sensitive portion.

25. The apparatus of claim 24 wherein the axes of said inwardly-converging passages are substantially parallel and are distributed for straddling said inspection axis as well as intersecting said inspection axis.

26. The apparatus of claim 24 further including: a target of radiation-attenuating material eccentrically mounted on said annular member diametrically opposite from said body thereon.

27. The apparatus of claim 24 further including: means selectively operable for rotating said annular member for progressively sweeping said beams of radiation about the circumference of a pipe section moving along said inspection axis.

28. The apparatus of claim 27 further including: indicating means coupled to said radiation detector and responsive to movement of a pipe section along said inspection axis for successively measuring the wall thickness of such a pipe section along a helical path therearound.

29. The apparatus of claim 28 further including: means adapted to average a succession of such thickness measurements for measuring the cross-sectional wall area of the scanned portion of such a pipe section.

* * * * *